United States Patent
Castelli et al.

(10) Patent No.: US 10,772,295 B2
(45) Date of Patent: Sep. 15, 2020

(54) UNMANNED AERIAL VEHICLE FOR DETERMINING GEOLOCATION FORAGING ZONES

(71) Applicant: INTERNATIONAL BUSINESS MACHINES CORPORATION, Armonk, NY (US)

(72) Inventors: Vittorio Castelli, Croton on Hudson, NY (US); Ashish Kundu, Elmsford, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 15/243,133

(22) Filed: Aug. 22, 2016

(65) Prior Publication Data

US 2018/0049407 A1 Feb. 22, 2018

(51) Int. Cl.
*A01K 11/00* (2006.01)
*B64C 39/02* (2006.01)
(Continued)

(52) U.S. Cl.
CPC .......... *A01K 11/008* (2013.01); *A01K 1/0029* (2013.01); *A01K 15/02* (2013.01);
(Continued)

(58) Field of Classification Search
None
See application file for complete search history.

(56) References Cited

U.S. PATENT DOCUMENTS

| 6,389,735 B1* | 5/2002 | Holt | A01K 79/02 324/72 |
| 6,439,162 B1* | 8/2002 | van den Berg | A01K 1/0103 119/174 |

(Continued)

FOREIGN PATENT DOCUMENTS

| CN | 103782914 A | 5/2014 |
| CN | 203689138 U | 7/2014 |

(Continued)

OTHER PUBLICATIONS

Fava, F. et al., "Identification of hyperspectral vegetation indices for Mediterranean pasture characterization" International Journal of Applied Earth Observation and Geoinformation (Feb. 2009) pp. 233-243, vol. 11.

(Continued)

*Primary Examiner* — Christian Chace
*Assistant Examiner* — Michael F Whalen
(74) *Attorney, Agent, or Firm* — Tutunjian & Bitetto, P.C.; Anthony Curro

(57) ABSTRACT

An unmanned aerial vehicle for determining geolocation foraging zones for animals, the unmanned aerial vehicle comprising a processor-based monitoring device to monitor a plurality of geolocations, an identification device to identify an animal and to track a position of the animal in relation to the plurality of geolocations, a risk analysis device to evaluate a level of risk associated with each of the plurality of geolocations, and a mapping device coupled to the monitoring device to select a geolocation foraging zone when the level of risk associated with the geolocation foraging zone is below a predetermined threshold value.

20 Claims, 8 Drawing Sheets

(51) Int. Cl.
B64D 47/08 (2006.01)
A01K 15/02 (2006.01)
G06K 9/00 (2006.01)
A01K 1/00 (2006.01)

(52) U.S. Cl.
CPC ............ *B64C 39/024* (2013.01); *B64D 47/08* (2013.01); *G06K 9/00657* (2013.01); *B64C 2201/12* (2013.01)

(56) References Cited

U.S. PATENT DOCUMENTS

| | | | |
|---|---|---|---|
| 8,314,695 B2 | 11/2012 | Greenberg | |
| 2005/0081792 A1* | 4/2005 | Robbins | A01K 15/02 119/51.01 |
| 2005/0193955 A1* | 9/2005 | Robbins | A01K 15/02 119/174 |
| 2006/0112889 A1* | 6/2006 | Robbins | A01K 29/00 119/51.01 |
| 2009/0120374 A1* | 5/2009 | Hansen | A01M 29/06 119/719 |
| 2009/0272334 A1* | 11/2009 | Robbins | A01K 29/00 119/712 |
| 2013/0340305 A1* | 12/2013 | Mobley | A01K 29/005 40/300 |
| 2014/0261151 A1* | 9/2014 | Ronning | A01M 29/10 116/22 A |
| 2014/0352632 A1* | 12/2014 | McLaughlin | A01K 11/008 119/721 |
| 2015/0153477 A1* | 6/2015 | Wikelski | A61B 5/42 702/3 |
| 2015/0342150 A1* | 12/2015 | Womble | A01K 27/009 119/718 |
| 2016/0156720 A1* | 6/2016 | Bransfield, Jr. | G01S 19/14 709/227 |
| 2016/0295833 A1* | 10/2016 | Baize | A01K 15/023 |
| 2017/0027155 A1* | 2/2017 | Ehrlich | G06Q 50/02 |
| 2017/0079236 A1* | 3/2017 | Womble | A01K 1/033 |
| 2017/0079247 A1* | 3/2017 | Womble | A01K 27/009 |
| 2017/0083018 A1* | 3/2017 | Womble | A01K 27/009 |
| 2017/0188545 A1* | 7/2017 | Bivens | B64C 39/024 |
| 2017/0202185 A1* | 7/2017 | Trumbull | A01K 29/005 |
| 2017/0231213 A1* | 8/2017 | Gordon | A01M 7/0089 43/132.1 |
| 2017/0238505 A1* | 8/2017 | Gordon | A01K 15/021 |
| 2017/0251633 A1* | 9/2017 | Womble | A61B 34/10 |
| 2017/0258038 A1* | 9/2017 | Erlich | A01M 31/008 |
| 2018/0027772 A1* | 2/2018 | Gordon | A01K 15/023 |
| 2018/0029522 A1* | 2/2018 | Gordon | B60Q 1/0017 |
| 2018/0080782 A1* | 3/2018 | Noda | G01C 21/3461 |
| 2018/0310526 A1* | 11/2018 | Birch | A01K 15/023 |
| 2019/0031346 A1* | 1/2019 | Yong | A01M 7/0042 |
| 2019/0096067 A1* | 3/2019 | Jin | G06K 9/00 |
| 2019/0128862 A1* | 5/2019 | Willett | G01N 33/0032 |

FOREIGN PATENT DOCUMENTS

| | | |
|---|---|---|
| CN | 104156821 A | 11/2014 |
| NO | 2006009472 A2 | 1/2006 |
| WO | 2015068864 A1 | 5/2015 |

OTHER PUBLICATIONS

Haboudane, D. et al., "Integrated narrow-band vegetation indices for prediction of crop chlorophyll content for application to precision agriculture" Remote Sensing of Environment (Aug. 2002) pp. 416-426, vol. 81, Issues 2-3.

"Independent set (graph theory)" Wikipedia, Viewed on May 9, 2016, pp. 1-5, https://en.wikipedia.org/wiki/Independent_set_%28graph_theory%29 paper 14.

Lenkaitis, "Livestock flight zone research lays groundwork for drone use" http://www.progressivedairy.com/topics/barns-equipment/livestock-flight-zone-research-lays-groundwork-for-drone-use (Sep. 11, 2015).

Luby, M.,"A simple parallel algorithm for the maximal independent set problem" SIAM Journal on Computing (Sep. 1985) pp. 1036-1053, vol. 15, No. 4.

McGregor, B., "Complementary Grazing of Pastures by Goats, Sheet and Cattle" ACGA (Jan. 1985) pp. 1-5, http://www.acga.org.au/goatnotes/B021.php.

Numata, I. et al., "Characterization of pasture biophysical properties and the impact of grazing intensity using remotely sensed data" Remote Sensing of Environment (Mar. 2007) pp. 314-327, vol. 109.

Numata, I. et al., "Regional Characterization of Pasture Changes through Time and Space in Rondônia, Brazil" Earth Interactions (Sep. 2007) pp. 1-25, vol. 11.

"Spectroradiometer" Wikipedia, Viewed on Jul. 19, 2016, pp. 1-5, https://en.wikipedia.org/wiki/Spectroradiometer.

Szoldra, "This drone can paint your house better than you can", Tech Insider, Mar. 18, 2016.

* cited by examiner

UNMANNED AERIAL VEHICLE FOR DETERMINING GEOLOCATION FORAGING ZONES

BACKGROUND

Technical Field

The present invention relates generally to an unmanned aerial vehicle and, in particular, to an unmanned aerial vehicle for determining geolocation foraging zones.

Description of the Related Art

Livestock animals are raised in agricultural settings, such as farms, fields, and pastures, and such animals typically graze/forage on the land for food, such as plants, trees, leaves and/or grasses. However, overgrazing in a particular location for an extended amount of time without sufficient recovery periods may be detrimental to the land, wildlife, and livestock. For example, overgrazing may result in increased soil erosion, plant nutrient loss, desertification, adverse water quality, insufficient plant growth, and/or lack of biodiversity of the land.

Grazing systems have been employed to help improve forage production for livestock thereby minimizing the effects of overgrazing, which include seasonal grazing, rotational grazing, rest rotation, deferred rotation, patch-burn grazing, riparian area grazing management, and conservation grazing. Appropriate levels of grazing may be effective in stimulating and restoring plant growth, promoting nutrient dense soil, and reducing fire hazards due to forage buildup. Such strategies, however, often involve human interaction to determine appropriate grazing locations and establishing fencing perimeters, which can be expensive and time-consuming to construct. Accordingly, appropriating land use and grazing management techniques are important to balance maintaining forage, protecting quality of foraging locations from deterioration due to overgrazing, and maintaining biodiversity.

SUMMARY

According to an aspect of the present principles, an unmanned aerial vehicle for determining geolocation foraging zones for animals is provided. The unmanned aerial vehicle may include a processor-based monitoring device to monitor a plurality of geolocations, an identification device to identify at least one animal and to track a position of the at least one animal in relation to the plurality of geolocations, a risk analysis device to evaluate a level of risk associated with each of the plurality of geolocations, and a mapping device coupled to the monitoring device to select at least one geolocation foraging zone when the level of risk associated with the least one geolocation foraging zone is below a predetermined threshold value.

According to another aspect of the present principles, a method for determining geolocation foraging zones for animals using an unmanned aerial vehicle is provided. The method may include monitoring, using a processor-based monitoring device, a plurality of geolocations from the unmanned aerial vehicle, identifying at least one animal and tracking a position of the at least one animal in relation to the plurality of geolocations, evaluating a level of risk associated with each of the plurality of geolocations, and selecting at least one geolocation foraging zone when the level of risk associated with the least one geolocation foraging zone is below a predetermined threshold value.

According to another aspect of the present principles, a non-transitory computer readable storage medium for determining foraging zones for animals using an unmanned aerial vehicle is provided. The non-transitory computer readable storage medium may include a computer readable program for determining geolocation foraging zones for animals using an unmanned aerial vehicle, wherein the computer readable program, when executed on a computer, causes the computer to execute monitoring, using a processor-based monitoring device, a plurality of geolocations from the unmanned aerial vehicle, identifying at least one animal and tracking a position of the at least one animal in relation to the plurality of geolocations, evaluating a level of risk associated with each of the plurality of geolocations, and selecting at least one geolocation foraging zone when the level of risk associated with the least one geolocation foraging zone is below a predetermined threshold value.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
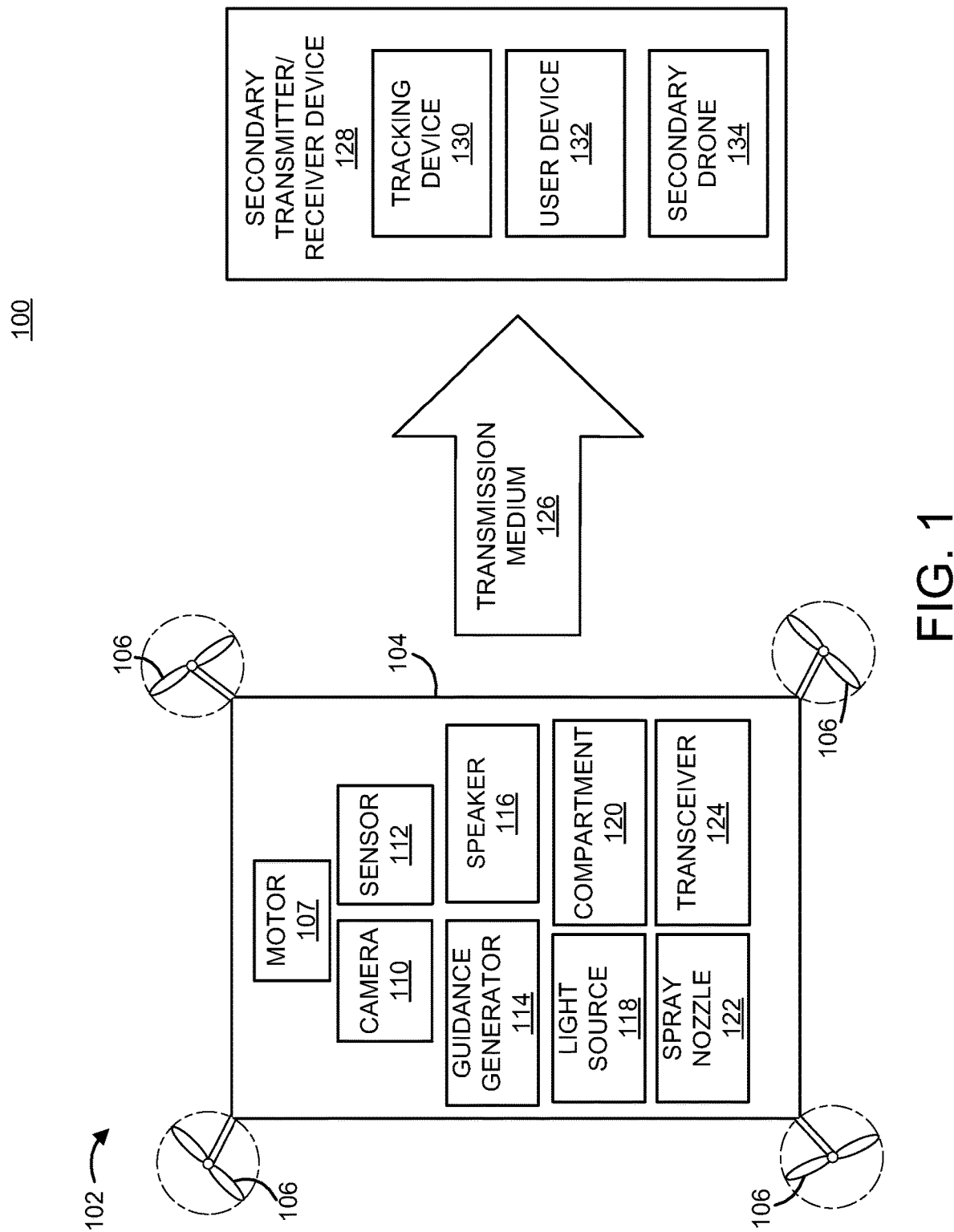
FIG. 1 shows an exemplary system for determining geolocation foraging zones for animals using an unmanned aerial vehicle, in accordance with an embodiment of the present principles.

The present principles are directed to an unmanned aerial vehicle for determining geolocation foraging zones for animals. In some embodiments, the present principles provide systems, methods and computer program products to monitor vegetation characteristics of particular geolocations and/or track geolocations of particular animals. In some embodiments, the system, method and computer program product described herein may detect and/or track animals and generate/select geolocation foraging zones based on location information associated with the detected animals. In further embodiments, the system, method and computer program product provided herein may enable the unmanned aerial vehicle to determine a level of risk associated with foraging zones and provide deterrence action such that animals avoid particularly dangerous foraging zones.

It should be understood that the word "animal" is used loosely and is not intended to suggest any limitation as to the scope of use or functionality of embodiments of the present principles described herein. For example, "animal" may refer to, but is not limited to, any wildlife species, stray animals, domesticated animals and/or non-domesticated animals, etc.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring to the drawings in which like numerals represent the same or similar elements and initially to FIG. 1, an exemplary system 100 for determining geolocation foraging zones for animals using an unmanned aerial vehicle 102 is illustratively depicted. It should be understood by one of ordinary skill in the art that the unmanned aerial vehicle 102 may comprise a drone, a drone-like unit, or a similarly functioning device.

The unmanned aerial vehicle 102 may include a housing unit 104, at least one movement mechanism 106, and a motor 107. The components of the unmanned aerial vehicle 102 may be affixed on the outside of the housing unit 104, or alternatively, may be enclosed within the housing unit 104 of the unmanned aerial vehicle 102. The unmanned aerial vehicle 102 may also include other elements (not shown) or may omit some elements as shown.

In some embodiments, the at least one movement mechanism 106 may include a single propeller, a plurality of propellers, a propulsion mechanism, or similarly functioning devices. In one embodiment, the at least one movement mechanism may be powered by at least one motor 107 and a power supply (not shown) to provide movement for the unmanned aerial vehicle. The movement mechanism(s) 106 may be placed at any desired location on the unmanned aerial vehicle 102, such that the placement of the movement mechanism(s) 106 does not interfere with each other or with another component positioned on the unmanned aerial vehicle 102.

Figure 3:
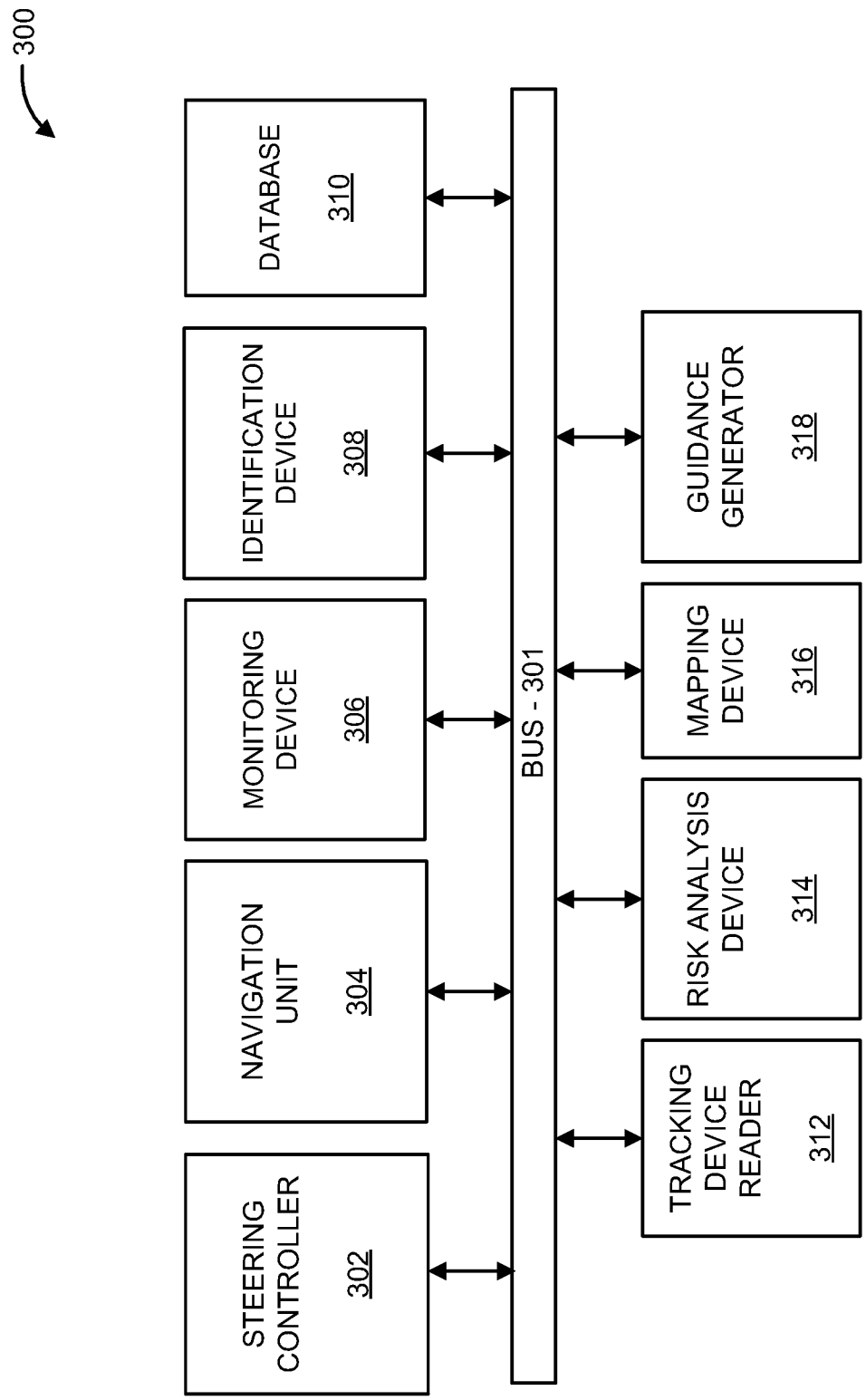
FIG. 3 shows an exemplary system for determining geolocation foraging zones for animals using an unmanned aerial vehicle, in accordance with an embodiment of the present principles.

In one embodiment, the movement mechanism 106 and/or motor 107 provides aerial movement for the unmanned aerial vehicle 102 in multiple degrees of freedom. Multiple degrees of freedom generally refers to the ability for the unmanned aerial vehicle 102 to move in a three-dimensional space. Specifically, the movement mechanism 106 and/or motor 107 may be controlled by a steering controller 302, as illustrated in FIG. 3, to move the unmanned aerial vehicle 102 along three perpendicular axes, namely forward/backward movement, up/down movement, and left/right movement. In addition, the steering controller 302 may control the movement of the unmanned aerial vehicle in 360 degree rotation, tilting forward/backward movement (e.g., pitching), swiveling left/right movement (e.g., yawing), and pivoting side to side movement (e.g., rolling).

In one embodiment, the movement mechanism(s) 106 and/or motor 107 provides movement for the unmanned aerial vehicle 102 to, for example, determine geolocation information for foraging zones and/or guide one or more animals to a selected foraging zone, which will be described in further detail below. In further embodiments, the movement mechanism(s) 106 and/or motor 107 provides movement for the unmanned aerial vehicle 102 to detect animal characteristics and to move the unmanned aerial vehicle 102 away from a detected animal. For example, drone proximity to an animal may be based on animal characterization (e.g., type of animal). In yet a further embodiment, the movement mechanism(s) 106 and/or motor 107 provides movement for the unmanned aerial vehicle 102 to avoid collision between the unmanned aerial vehicle 102 and an object, such as an animal, a tree, a building, and/or other structures.

The unmanned aerial vehicle 102 may include at least one camera 110. The camera 110 may be configured to provide visual feedback to the unmanned aerial vehicle 102, such as one or more still images and/or video feedback. In some embodiments, the camera 110 may capture/provide images of geolocations corresponding to vegetation/foliage to identify geolocation foraging zones. For example, the camera 110 may acquire an image of vegetation (e.g., grass, clovers, etc.), and using a monitoring device and/or an identification device, such as monitoring device 306 and/or identification device 308 in FIG. 3, the unmanned aerial vehicle 102 may track and/or identify vegetation characteristics (e.g., type of vegetation, quality of vegetation, quantity of vegetation, etc.) and may provide corresponding geolocation information, such as map coordinates, to generate a virtual map indicating foraging zones (e.g., areas in which animals may forage and/or where grazing may be beneficial).

For example, the camera 110 may acquire information associated with a particular geolocation, such as pasture biophysical properties (e.g., biomass, leaf area index, nitrogen content, chlorophyll content, grass density, canopy height, etc.). Biomass may include any biologically-produced matter based in carbon, hydrogen and oxygen. Leaf area index may include quantifications of plant canopies, such as measuring leaf area per unit ground surface area. The camera 110 may capture hemispherical images (e.g., upward-looking fisheye images) of an area taken beneath a plant canopy to determine the ratio of the area of canopy to sky to approximate leaf area index. In some embodiments, the camera 110 may capture images of areas having soil to compute a soil cover fraction (e.g., percentage of soil coverage over a geolocation). Such information may be indicative of highly nutritional geolocation foraging zones.

In an embodiment, the camera 110 may obtain images of geolocations and, in combination with a global positioning system (GPS), such as navigation unit 304 in FIG. 3, the camera 110 may provide coordinate information associated with the captured images. In some embodiments, the unmanned aerial vehicle 102 may employ at least one processer to process machine vision methods and/or machine learning methods. For example, the camera 110 may obtain at least one image and the monitoring device 306 may employ various imaging processing techniques to extract information, such as vegetation type, vegetation quality, vegetation quantity, etc. The camera 110 may be configured to employ image comparison techniques to identify the particular type of vegetation present within a captured image, such as grass, weeds, trees, etc., and the quality of the vegetation (e.g., greenness, level of vegetation deterioration, rot, etc.). Accordingly, the camera 110 may help to identify geolocation foraging zones.

In some embodiments, the camera 110 may, in combination using a monitoring device and/or an identification device, detect landscape boundaries. Landscape boundaries may indicate, for example, areas in which grazing and/or geolocation foraging zones may be excluded. In an embodiment, landscape boundaries may include fencing, roadways, pathways, streams, waterways, gullies, topography (e.g., sloped areas), etc. which may be indicative of private property boundary lines and/or impassable areas. Accordingly, property belonging to individual owners and/or impassable areas may be excluded from the foraging zones. In some embodiments, the landscape boundaries may include wildfires, construction areas, poisonous vegetation, presence of predators, weather conditions, etc. Because poisonous vegetation and/or predators may be dependent on the type of animal in which grazes in that particular location, the camera 110 may detect and identify various types of animals, as will be described in further detail below.

In one embodiment, the camera 110, which may include at least one processor, may be configured to detect one or more animals and may identify the type of animal detected. It should be understood that the word "animal" should be interpreted loosely and may include, but is not limited to, any domesticated and/or non-domesticated species. The camera 110 may capture one or more still images or video images and, using a database, may perform image comparison with database images to determine the type of animal detected. In an embodiment, the camera 110 may be configured to track locations of one or more animals to avoid overgrazing of herds by periodically capturing images of animal movement and mapping such geolocations. Further, the camera 110 may be configured to determine density of a herd, such as an estimated amount of animals present in a particular animal herd. A herd may be defined as a grouping of certain animals belonging to the same species. Although the present principles are directed to a herd of animals, other groupings of animals, such as flocks, packs, gaggles, etc., are readily contemplated.

In some embodiments, the camera 110 and/or processor may identify different animals, animal characteristics, herd combinations, and/or predator/prey relationships between animals. For example, the camera 110 may identify a particular animal belonging to a herd, such as cattle. In addition, the camera 110 may identify another animal belonging to a different herd, such as goats. The grazing of cattle and goats in the same area may be beneficial, since grazing these animals together may increase clover consumption than in areas in which these herds graze separately. Accordingly, the camera 110 may be employed to detect and/or identify herd combinations having a plurality of different animal types. In an embodiment, the camera 110 may be configured to assess and/or approximate an animal's characteristics, such as age and/or health of the animal using image comparison techniques. In an embodiment, the camera 110 may detect and/or identify a predator within a particular geolocation such that geolocation foraging zones are avoided when a herd includes animals of prey particular to the detected predator.

The camera 110 may be positioned on the unmanned aerial vehicle 102 such that the camera may provide visual feedback in 360 degrees on a horizontal plane and/or 360 degrees on a vertical plane of the unmanned aerial vehicle 102. In some embodiments, the camera 110 may include a plurality of cameras to provide visual feedback in all directions surrounding the unmanned aerial vehicle 102 such that there are no obscurations of the visual field (e.g., blind spots). In further embodiments, the camera 110 may be embedded within the housing unit 104 so as to prevent any negative effects to the aerodynamics of the unmanned aerial vehicle 102.

In a further embodiment, the camera 110 may be configured to provide visual feedback of obstacles in the path of the unmanned aerial vehicle 102 for any purpose, such as, but not limited to, navigation guidance to the unmanned aerial vehicle 102. It should be understood that various types of cameras are contemplated, including night-vision enabled cameras, infrared sensing cameras, X-ray imaging devices, line scan imaging devices, etc.

In an embodiment, the unmanned aerial vehicle 102 may include at least one sensor 112. The sensor 112 may include, but is not limited to, an acoustic sensor (e.g., microphone), a chemical sensor, an infrared sensor, an optical sensor, a collision avoidance sensor (e.g., a proximity sensor), a heat sensor, etc. In an embodiment, the sensor 112 may be configured to identify geolocations corresponding to vegetation/foliage to generate geolocation foraging zones. For example, the sensor 112 may detect information associated with a particular geolocation, such as biomass, leaf area index, nitrogen content, chlorophyll content, etc.

In an embodiment, the sensor 112 may include a spectroradiometer to detect information associated with a particular geolocation, such as remote sensing data to estimate biophysical characteristics (e.g., biomass, nitrogen content, chlorophyll content, etc.) of a geolocation. A spectroradiometer may include a plurality of components, such as an input for optics, a monochromator, a detector, and/or a control system, to measure spectral power distribution of a source, the source being a pasture or geolocation having vegetation, to measure, characterize and/or calibrate light sources. In some embodiments, the sensor 112 (e.g., spectroradiometer) may detect and/or analyze reflectance data reflected from a geolocation having foliage/vegetation. For example, low reflectance in red may be due to chlorophyll absorption. In some embodiments, the sensor 112 may detect nitrogen concentration and/or nitrogen content using near-infrared reflectance spectroscopy measurements.

In some embodiments, the sensor 112 may estimate vegetation characteristics, such as an estimated amount of vegetative material in a geolocation, using sound and/or acoustical information. The sensor 122 may include, for example, a transmitter, receiver, transceiver, condenser microphone, transducer, or combination thereof. In an embodiment, the sensor 112 may generate/transmit a sound burst (e.g., sound signal, acoustic signal, ultrasonic sound pulse, etc.) in a geolocation and the sensor 112 may be configured to receive acoustic information (e.g., an echo of the sound burst) reflected from the geolocation which may be indicative of vegetative material in the geolocation (e.g., approximated amount of vegetation). In some embodiments, the sound burst may include an ultrasonic sound burst that may be reflected from the vegetative material. The estimated/approximated amount of vegetation may include, for example, volume, density, and/or weight associated with the vegetative material.

In some embodiments, the sensor 112 may detect one or more environmental variables in a particular geolocation. The one or more environmental variables may include, for example, atmospheric pressure, humidity levels, temperatures, etc. associated with a geolocation. In an embodiment, the one or more environmental variables may be employed to determine a level of risk associated with the geolocation, as will be described in further detail below.

In an embodiment, the sensor 112 may detect and/or monitor proximity to one or more objects, including topography of the particular geolocation. The topography of a geolocation may include various objects/obstacles, such as ditches, gullies, waterways, etc. that may be impassible by certain animal herds and/or may pose a heightened risk to certain animals. For example, cliffs may be impassible by cattle herds however may be suitable for goat herds. In an embodiment, the sensor 112 may include one or more proximity sensors to detect the presence of slope variations of the ground which may be employed to determine a level of risk associated with the geolocation, as will be described in further detail below.

The sensor 112 may, in some embodiments, identify an animal type based on detecting sounds made by the animal, such as chirping, honking, growling, roaring, barking, etc. Accordingly, the sensor 112 may identify the particular type of animal based on the sounds made by such animal and/or animal herd. In a further embodiment, the sensor 112 may be configured to detect proximity to objects and/or obstacles in the path of the unmanned aerial vehicle 102 for any purpose such as, but not limited to, navigation guidance to the unmanned aerial vehicle 102.

The unmanned aerial vehicle 102 may include a guidance generator 114. In some embodiments, the guidance generator 114 may perform one or more functions to guide/lead the detected animals to a selected geolocation foraging zone. The one or more functions may include, for example, generating a sound (e.g., beep, horn, etc.) and/or verbal instructions/commands via speaker 116, illuminating a light source 118, dispensing animal feed from compartment(s) 120, dispensing an aromatic substance (e.g., citronella) or air via spray nozzle 122, and/or activating the movement mechanisms 106 such that movement from the unmanned aerial vehicle 102 induces the animals to relocate.

In some embodiments, the guidance generator 114 may perform the one or more functions to split a herd into a plurality of groups to trigger different traversal paths. For example, a single herd may be split into two groups where the two groups are lead to different geolocation foraging zones. Some animals may respond and/or react to drones based on the animal's proximity to the drone. For example, horses and drylot cows relocate and/or "flee" when a drone comes within 25 feet, whereas goats and cow-calf pairs relocate when a drone comes within 15 feet. In some embodiments, the guidance generator 114 may split a herd having different animals by adjusting the proximity of the unmanned aerial vehicle 102 to the animal(s). Accordingly, proximity to the unmanned aerial vehicle 102 from one or more animals may be employed by the guidance generator 114 as a parameter to trigger herd splitting. In an embodiment, splitting of a herd may be aided by trained responses from the animal(s) with respect to light, sounds, scents, etc. Splitting of a herd may be beneficial to avoid overgrazing of geolocation foraging zones. In some embodiments, the at least one function may redirect one or more animals away from a particular geolocation, such as those geolocations having landscape boundaries (e.g., private property, poisonous vegetation, predators, etc.).

In a further embodiment, the guidance generator 114 may transmit harmless signals via a transceiver 124, such as static electrical signals, electromagnetic signals, microwave energy, microwave radiation, etc., towards an animal to redirect the animal toward a selected geolocation foraging zone and/or away from landscape boundaries. In some embodiments, the guidance generator 114 may transmit a static electrical signal and/or vibration signal to a secondary transmitter/receiver device 128, such as a collar or tracking device 130 worn by the animal. The static electrical signal and/or vibration signal may cause the animal to relocate, such as towards a geolocation foraging zone, and/or away from non-selected geolocations (e.g., zones having landscape boundaries).

In some embodiments, one or more animals may be equipped with a tracking device 130, which may include an internal microchip (e.g., an integrated circuit implanted under the skin of an animal), external microchips (e.g., RFID ear tags), leg rings, wing tags, fin clippings, acoustic tags and/or adhesive tags. The tracking devices 130 on each animal may directly communicate with each other and/or the unmanned aerial vehicle 102 to communicate location information and/or movement information for each animal. In an embodiment, each tracking device 130 may monitor information associated with a respective animal, such as location of the animal (e.g., movement of the animal) and/or health characteristics of the animal (e.g., temperature, blood information, pulse rate, oxygen content, etc.).

In some embodiments, the tracking device 130 may be in communication with a base station, such as the unmanned aerial vehicle 102, and the unmanned aerial vehicle 102 may receive such information on each tracking device 130 indirectly via the base station. In some embodiments, the tracking device 130 may provide individual information for the particular animal it is tracking, such as temperature of the animal, movement of the animal, and/or blood information of the animal. In some embodiments, the tracking device 130 may provide the animal with a stimulus, such as a sound, electric shock and/or vibration, generated by the guidance generator 114 to guide the animal to a selected geolocation foraging zone.

The transceiver 124 may be configured to provide feedback information to/from the unmanned aerial vehicle 102 and a secondary transmitter/receiver device 128 via a transmission medium 126. For example, the transceiver device 124 may provide at least one of the following to the secondary transmitter/receiver device 128: images and/or video feedback from the camera 110, audio and/or proximity information from the sensor 112, a list of functions performed by the guidance generator 114, geolocation information of foraging zones, detected animals, landscape boundaries, etc.

The secondary transmitter/receiver device 128 may include, but is not limited to, a user device 132 (e.g., a mobile device, tablet, computing device, etc.), a secondary drone 134, or similarly functioning devices. For example, the user device 132 may include a computing device used by ranchers to plan grazing schedules. In an embodiment, the user device 132 may receive information regarding the geolocation of foraging zones and/or animal herds, and use such information to plan grazing routes so as to optimally prevent overgrazing and/or reduce risk to animal herds.

In another embodiment, feedback information to/from the unmanned aerial vehicle 102 may be transmitted to and/or received by a secondary drone 134. For example, a plurality of drones may detect and/or communicate information regarding geolocation of foraging zones and animal herds, including animal characteristics associated with each herd, to further generate geolocation information of foraging zones which may evolve over time. Accordingly, a plurality of geolocations foraging zones may be monitored simultaneously.

In some embodiments, a plurality of drones, including the unmanned aerial vehicle 102 and secondary drones 134, may perform the one or more functions of the guidance generator 114. For example, the unmanned aerial vehicle 102 may communicate with the secondary drones 134 to redirect an animal and/or herd towards a selected geolocation foraging zone and/or away from landscape boundaries. Accordingly, the present principles provide monitoring geolocation foraging zones and customized redirecting of animal herds over any size of property and is not limited to devices that are controlled by wires and/or devices that fail to function properly beyond the device's reach, such as visible and/or invisible electric fencing.

It is to be appreciated that system 200 described below with respect to FIG. 2, and system 300 described below with respect to FIG. 3, are systems for implementing respective embodiments of the present principles. Part or all of processing system 100 may be implemented in one or more of the elements of system 200 of FIG. 2 and/or system 300 of FIG. 3. Further, it is to be appreciated that processing system 100, 200 and/or 300 may perform at least part of the method described herein, including, for example, at least part of method 400 of FIG. 4.

Figure 2:
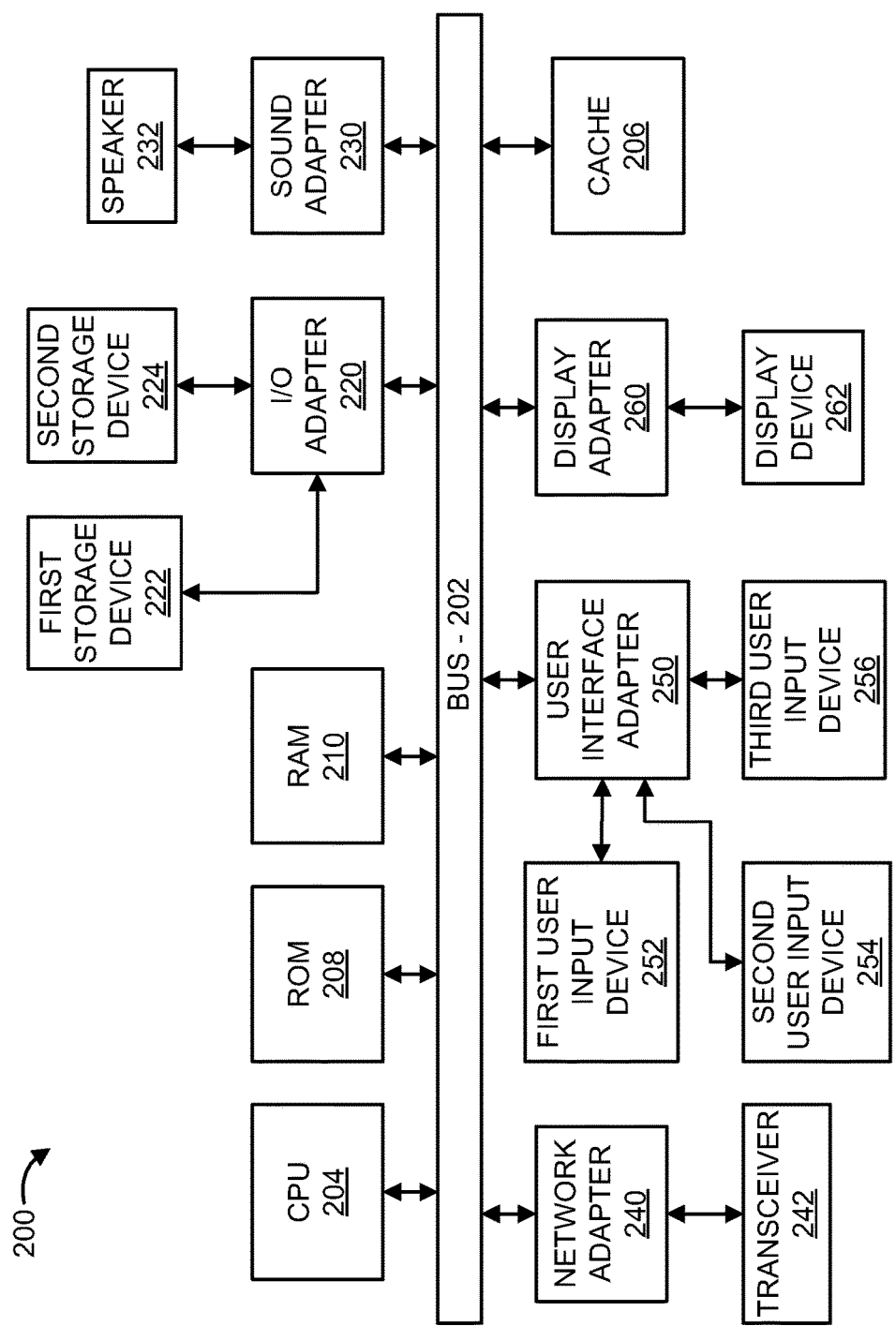
FIG. 2 shows an exemplary processing system for determining geolocation foraging zones for animals using an unmanned aerial vehicle, in accordance with an embodiment of the present principles.

Now referring to FIG. 2, with continued reference to FIG. 1, an exemplary processing system 200 to which the present principles may be applied, in accordance with an embodiment, is illustratively depicted. The processing system 200 includes at least one processor, such as a computer processing unit (CPU) 204, operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260 are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, etc. The storage devices 222 and 224 can be the same type of storage device or different types of storage devices. In one embodiment, database images of geolocations (e.g., satellite images) and/or animals may be stored on the first storage device 222 and/or the second storage device 224 for comparison with images obtained by the camera 110 of FIG. 1.

A speaker 232 is operatively coupled to system bus 202 by the sound adapter 230. In one embodiment, the unmanned aerial vehicle 102 may be configured to perform one or more function to redirect an animal and/or herd towards a selected geolocation foraging zone and/or away from landscape boundaries by, for example, providing an audio signal, such as a beep and/or sound of a predator animal, from the speaker 232.

A transceiver 242 is operatively coupled to system bus 202 by network adapter 240. A display device 262 is operatively coupled to system bus 202 by display adapter 260. In an embodiment, the display device 262 may be configured to display geolocation information and/or geolocation foraging zones provided by the transceiver 242. In some embodiments, the display device 262 may display, to a user, a virtual map having at least one geolocation foraging zone and/or information related to a detected animal. For example, the display device 262 may display geolocation foraging zones where grazing may be beneficial and/or landscape boundaries where grazing may be avoided. In some embodiments, the virtual map displayed on the display device 262 may be used to further track/monitor vegetation degradation over time.

A first user input device 252, a second user input device 254, and a third user input device 256 are operatively coupled to system bus 202 by user interface adapter 250. The user input devices 252, 254, and 256 can be any type of input device, including but not limited to, a keyboard, a mouse, a keypad, an image capture device, a motion sensing device, a microphone, a device incorporating the functionality of at least two of the preceding devices, and so forth. The user input devices 252, 254, and 256 can be the same type of user input device or different types of user input devices. The user input devices 252, 254, and 256 are used to input and output information to and from system 200.

The processing system 200 may also include other elements (not shown) or may omit some elements as shown. For example, various other input devices and/or output devices can be included in processing system 200 depending upon the particular implementation of the same, such as various types of wireless and/or wired input and/or output devices. Moreover, additional processors, controllers, memories and so forth, in various configurations, can also be utilized. These and other variations of the processing system 200 are readily contemplated.

Referring now to FIG. 3, with continued reference to FIG. 1, an exemplary system 300 for an unmanned aerial vehicle 102 for determining geolocation foraging zones for animals is shown, in accordance with an embodiment of the present principles. The system 300 includes a steering controller 302, a navigation unit 304, a monitoring device 306, an identification device 308, a database 310, a tracking device 312, a risk analysis device 314, a mapping device 316, and/or a guidance generator 318.

The steering controller 302 may be configured to control movement of the unmanned aerial vehicle 102. In one embodiment, the steering controller 302 may include a motor, such as motor 107 in FIG. 1. In some embodiments, the steering controller 302 may control the aerial movement of the unmanned aerial vehicle 102 by controlling the at least one movement mechanism 106 and/or motor 107 illustrated in FIG. 1. For example, the steering controller 302 may control aerial movement of the unmanned aerial vehicle 102 by sending control signals to the at least one movement mechanism 106 and/or motor 107.

In an embodiment, the steering controller 302 may control the aerial movement of the unmanned aerial vehicle 102 based on geolocation foraging zones and/or detection of animals, animal herds and/or particular animal characteristics. For example, the steering controller 302 may provide aerial movement to the unmanned aerial vehicle 102 to determine geolocation information for foraging zones and/or guide one or more animals to a selected foraging zone. In some embodiments, the steering controller 302 may provide aerial movement to the movement mechanism(s) 106 and/or motor 107 of the unmanned aerial vehicle 102 to steer the unmanned aerial vehicle 102 away from a detected animal, especially when the animal(s) is alarmed by and/or aggressive towards the unmanned aerial vehicle 102. In yet a further embodiment, the steering controller 302 may provide movement for the unmanned aerial vehicle 102 to avoid collision between the unmanned aerial vehicle 102 and an object, such as an animal, a tree, building, or other structure.

The system 300 may include a navigation unit 304, such as a global positioning system (GPS). The navigation unit 304 may provide location information for particular geolocations to the steering controller 302 and/or mapping device 312. For example, the navigation unit 304 may include map coordinates of a particular geolocation foraging zone and may provide such information to the steering controller 302, such that the steering controller 302 may direct the unmanned aerial vehicle 102 to a particular location. In some embodiments, the navigation unit 304 may provide gradient information of the landscape for a particular location to the steering controller 304, such that the steering controller 304 avoids collision between the unmanned aerial vehicle 102 with landscape features, such as mountains, cliffs, etc.

In an embodiment, the system 300 may include a monitoring device 306. The monitoring device 306 may include a camera, a sensor, a radar system or similarly functioning system to monitor geolocation information associated with vegetative material and/or landscape boundaries. For example, the monitoring device 306 may include a camera, such as camera 110 of FIG. 1, and/or any type of processor-based monitoring device to provide visual feedback, including still images and/or video sequences, to the unmanned aerial vehicle 102. In an embodiment, the monitoring device 306 may provide the geolocation information, including map coordinates associated with the captured image, to the mapping device 316 to generate foraging zones, which will be described in further detail below.

In an embodiment, the monitoring device 306 may employ field spectrometry, hyperspectral airborne and satellite instruments, and/or multispectral satellite data to characterize vegetation properties. For example, the monitoring device 306 may capture one or more images of geolocations corresponding to vegetation/foliage and/or landscape boundaries. In an embodiment, the monitoring device 306 my capture and/or receive images from satellite devices of geolocations corresponding to vegetation/foliage and/or landscape boundaries. In some embodiments, the landscape boundaries may be provided by property maps stored on the storage device 320 and/or navigation unit 304.

In an embodiment, the monitoring device 306 may identify vegetation characteristics (e.g., type of vegetation, quality of vegetation, quantity of vegetation, etc.) and may provide corresponding geolocation information, such as map coordinates, to the mapping device 316 to generate a virtual map indicating geolocation foraging zones (e.g., areas in which animals may forage and/or where grazing may be beneficial). For example, the monitoring device 306 may detect information associated with a particular geolocation, such as biomass, leaf area index, nitrogen content, chlorophyll content, etc. In some embodiments, the monitoring device 306 may estimate an approximated amount of exposed soil, vegetative material, and/or canopy architecture to determine the vegetative viability of the particular geolocation. The vegetative viability may be defined as the nutritional value and/or expected vegetative lifetime of the foraging zone over a period of time. In a further embodiment, the monitoring device 306 may detect one or more environmental variables in a particular geolocation, such as atmospheric pressure, humidity levels, temperatures, etc. associated with a geolocation.

The identification device 308 may detect and identify one or more animals and the type of each animal as well as geolocation information for one or more animals. For example, the identification device 308 may perform image comparison with database images stored in database 310 to determine the type(s) of animals present in a herd. In an embodiment, the identification device 308 may identify the type of one or more animals based on detecting sounds made by the animal and using audio comparison techniques with sounds stored in database 310.

In some embodiments, the identification device 308 may estimate density of a herd, such as an estimated amount of animals present in a particular animal herd. Further, the identification device 308 may track movement of one or more animals by periodically monitoring geolocation information for the one or more animals. The identification device 308 may periodically update geolocation for each animal, which may be stored in database 310. In an embodiment, identification device 308 may assess and/or approximate an animal's characteristics, such as age and/or health of the animal using image comparison techniques. In a further embodiment, the identification device 308 may detect and/or identify a predator within a particular geolocation, including predator/prey relationships stored in database 310, such that geolocation foraging zones are avoided (e.g., not selected) when a herd includes animals of prey particular to a detected predator.

In an embodiment, the database 310 may store information related to past grazing areas and/or types of animals that have grazed in particular foraging areas. Accordingly, the mapping device 316 may appropriately select a geolocation foraging zone such that overgrazing in particular zones are avoided. In addition, the database 310 may store pairs of animal types that may graze together. For example, grazing cattle and goat herds may be beneficial to pastures instead of grazing these herds separately.

In an embodiment, the system 300 may include a tracking device reader 312. The tracking device reader 312 may be configured to extract identification information from a particular animal that has been detected/tracked. In some embodiments, the tracking device reader 312 may include a Radio Frequency Identification (RFID) reader. The tracking device reader 312 may be configured to extract the identification information stored on tags and/or tracking devices attached to animals and/or imbedded under an animal's skin, such as tracking device 130 of FIG. 1. The tracking device reader 312 may employ passive RFID technology to read and/or scan the tracking device (e.g., integrated circuit) to extract the identification information stored on the tag, which may include an identification number, type of animal, previous grazing locations, etc.

The risk analysis device 314 may be configured to evaluate a level of risk associated with a geolocation foraging zone. An increase in level of risk may be indicative of zones that may experience overgrazing (due to poor vegetative material) and/or do not provide adequate means to obtain the vegetative material (due to impassible terrain). Many factors may contribute to increase risk of a geolocation foraging zone. For example, the occurrence of landscape boundaries, such as cliffs and waterways impassible by certain animals, may provide an increased risk associated with a geolocation foraging zone. In addition, drastic slope variations along the terrain in a geolocation foraging zone may increase risk of a geolocation foraging zone, as animals may be unduly stressed by traversing the sloped terrain. Accordingly, animals may not graze in such sloped areas which may lead to overgrazing in other areas.

Other factors, such as environmental variables, may be employed to determine a level of risk associated with the geolocation foraging zone. Environmental variables may include, for example, atmospheric pressure, humidity levels, temperatures, etc. associated with a geolocation. For example, animals may not graze during high temperatures. In some embodiments, the risk analysis device 314 may receive weather predictions (e.g., weather forecast) and/or weather analysis information to determine the level of risk associated with the geolocation foraging zone. In an embodiment, the risk analysis device 314 may employ historical data to determine the level of risk associated with the geolocation foraging zone, such as viability of vegetation. For example, geolocation foraging zones located near water sources may be viable for longer periods than other geolocation foraging zones. In some embodiments, the risk analysis device 314 may be used to determine whether or not a geolocation foraging zone should be selected, as will be described in further detail below. For example, a geolocation foraging zone may be selected, by the mapping device 316, when the level of risk associated with the geolocation foraging zone is below a predetermined threshold.

The system 300 may include a mapping device 316. The mapping device 316 may be coupled to the monitoring device 306 to select, determine and/or generate geolocation foraging zones. In some embodiments, the geolocation foraging zones may be generated on a virtual map, which may be displayed to a user. The mapping device 316 may select a geolocation foraging zone when the level of risk associated with the geolocation foraging zone is below a predetermined threshold. For example, the mapping device 316 may select geolocation foraging zones having a reduced occurrence of landscape boundaries and/or increased vegetative material (e.g., vegetative quantity, quality, etc.). Accordingly, the mapping device 316 may optimally select geolocation foraging zones to avoid overgrazing. In some embodiments, the mapping device 316 may select geolocation foraging zones based on current vegetation, past vegetation, and forecasted vegetation information. The mapping device 316 may identify, on a virtual map, selected geolocation foraging zones.

The system 300 may further include a guidance generator 318. The guidance generator 318 may be configured to perform one or more functions to guide/lead the detected animals to the selected geolocation foraging zone. The one or more functions may include, for example, generating a sound (e.g., beep, horn, predator sound, etc.) and/or verbal instructions/commands, illuminating a light source, dispensing animal feed from compartments on the unmanned aerial vehicle 102, dispensing an aromatic substance (e.g., citronella), and/or moving the unmanned aerial vehicle 102 such that the movement induces the animals to relocate. In some embodiments, the guidance generator 318 may perform the one or more functions to split a herd into a plurality of groups to trigger different traversal paths, such as splitting a herd into two groups where the two groups are lead to different geolocation foraging zones. In some embodiments, the at least one function may redirect one or more animals away from a particular geolocation, such as those geolocations having landscape boundaries (e.g., private property, poisonous vegetation, predators, etc.).

In the embodiment shown in FIG. 3, the elements thereof may be interconnected by a bus 301. However, in other embodiments, other types of connections can also be used. Moreover, in an embodiment, at least one of the elements of system 300 is processor-based. Further, while one or more elements may be shown as separate elements, in other embodiments these elements can be combined as one element. These and other variations of the elements of system 300 are readily contemplated.

Figure 4:
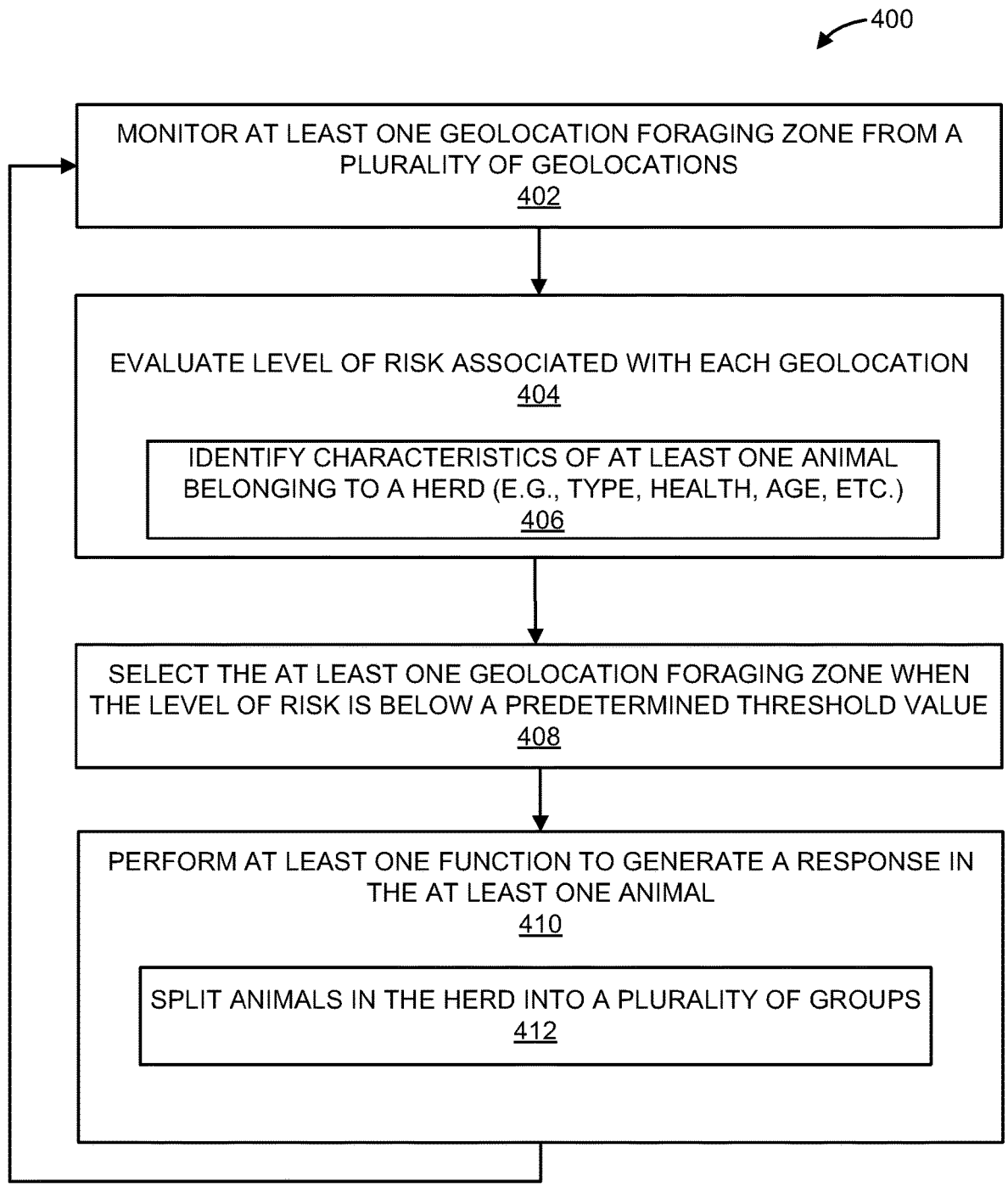
FIG. 4 shows an exemplary method for determining geolocation foraging zones for animals using an unmanned aerial vehicle, in accordance with an embodiment of the present principles.

Now referring to FIG. 4, with continued reference to FIGS. 1-3, FIG. 4 shows an exemplary method 400 for determining geolocation foraging zones for animals using an unmanned aerial vehicle 102, in accordance with an embodiment of the present principles.

In block 402, the method 400 may include monitoring, using a processor-based monitoring device, such as monitoring device 306 of FIG. 3, a plurality of geolocations. The plurality of geolocations may include geolocation foraging zones (e.g., where grazing may be beneficial) and/or geolocations having one or more landscape boundaries. Monitoring may include characterizing vegetative material within the at least one geolocation foraging zone, such as determining type of vegetation, quantity of vegetation, quality of vegetation, etc. In some embodiments, monitoring may include detecting one or more landscape boundaries, such as slope variations, cliffs, etc.

In block 404, the method 400 may include evaluating a level of risk associated with the at least one geolocation foraging zone. An increase in level of risk may be indicative of zones that may experience overgrazing (due to poor vegetative material) and/or do not provide adequate means to obtain the vegetative material (due to impassible terrain). Evaluating the level or risk may include, for example, monitoring of one or more factors, such as occurrence of landscape boundaries, drastic slope variations, environmental variables (e.g., atmospheric pressure, humidity levels, temperatures, etc.), historical data, etc. In an embodiment, evaluating the level or risk may include identifying at least one animal and/or animal characteristics of at least one animal, as shown in block 406. For example, identifying at least one animal and/or animal characteristics may include determining the type of animal, age of the animal, health of the animal, etc.

In block 408, the method 400 may include selecting at least one geolocation foraging zone when the level of risk associated with the at least one geolocation foraging zone is below a predetermined threshold value. For example, selecting may include selecting geolocation foraging zones having a reduced occurrence of landscape boundaries and/or increased vegetative material (e.g., vegetative quantity, quality, etc.). In some embodiments, selecting geolocation foraging zones may include generating a virtual map and identifying the selected geolocation foraging zones on the virtual map.

In an embodiment, the method 400 may include performing at least one function to generate a response by the at least one animal, as illustrated in block 410. In some embodiments, the at least one function may guide/lead the at least one animal to the selected geolocation foraging zone and/or away from a particular geolocation, such as those geolocations having landscape boundaries (e.g., private property, poisonous vegetation, predators, etc.). The one or more functions may include, for example, generating a sound (e.g., beep, horn, predator sound, etc.) and/or verbal instructions/commands, illuminating a light source, dispensing animal feed from compartments on the unmanned aerial vehicle 102, dispensing an aromatic substance (e.g., citronella), and/or moving the unmanned aerial vehicle 102 such that the movement induces the animals to relocate. In some embodiments, performing the at least one function may include splitting animals in a herd into a plurality of groups to trigger different traversal paths, such as splitting a herd into two groups where the two groups are lead to different geolocation foraging zones, as illustrated in block 412. It should be noted that blocks of 402-412 may be continuously repeated.

Figure 5:
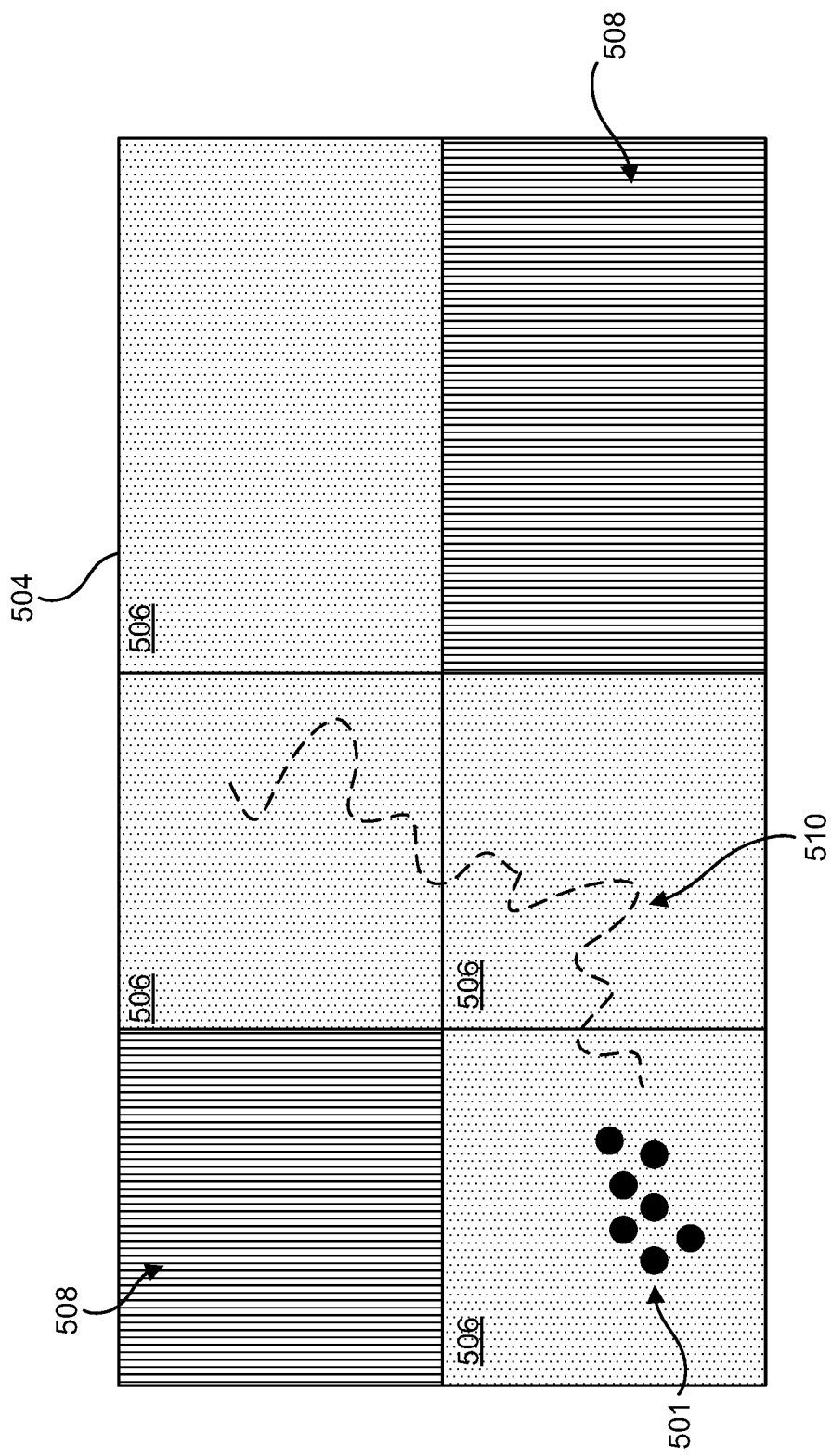
FIG. 5 shows an exemplary system/method for determining geolocation foraging zones for animals using an unmanned aerial vehicle, in accordance with an embodiment.

Now referring to FIG. 5, an exemplary system/method for determining geolocation foraging zones for animals using an unmanned aerial vehicle 102 is illustratively depicted. As shown in FIG. 5, the unmanned aerial vehicle 102 may monitor a plurality of geolocation foraging zones and/or landscape boundaries and generate a virtual map 504. The virtual map 504 may include zones designated for foraging 506 and zones designated for non-foraging 508. For example, foraging zones 506 may include geolocations of highly nutritional vegetative material, while non-foraging zones 508 may include one or more landscape boundaries (e.g., cliffs, private property, waterways, etc.) that have a risk level exceeding a predetermined threshold value. In some embodiments, the virtual map 504 may display one or more animals 501. As described above, the unmanned aerial vehicle 102 may perform one or more functions to generate a response in at least one animal, such as leading the animals 501 to other foraging zones 506 along a path 510.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
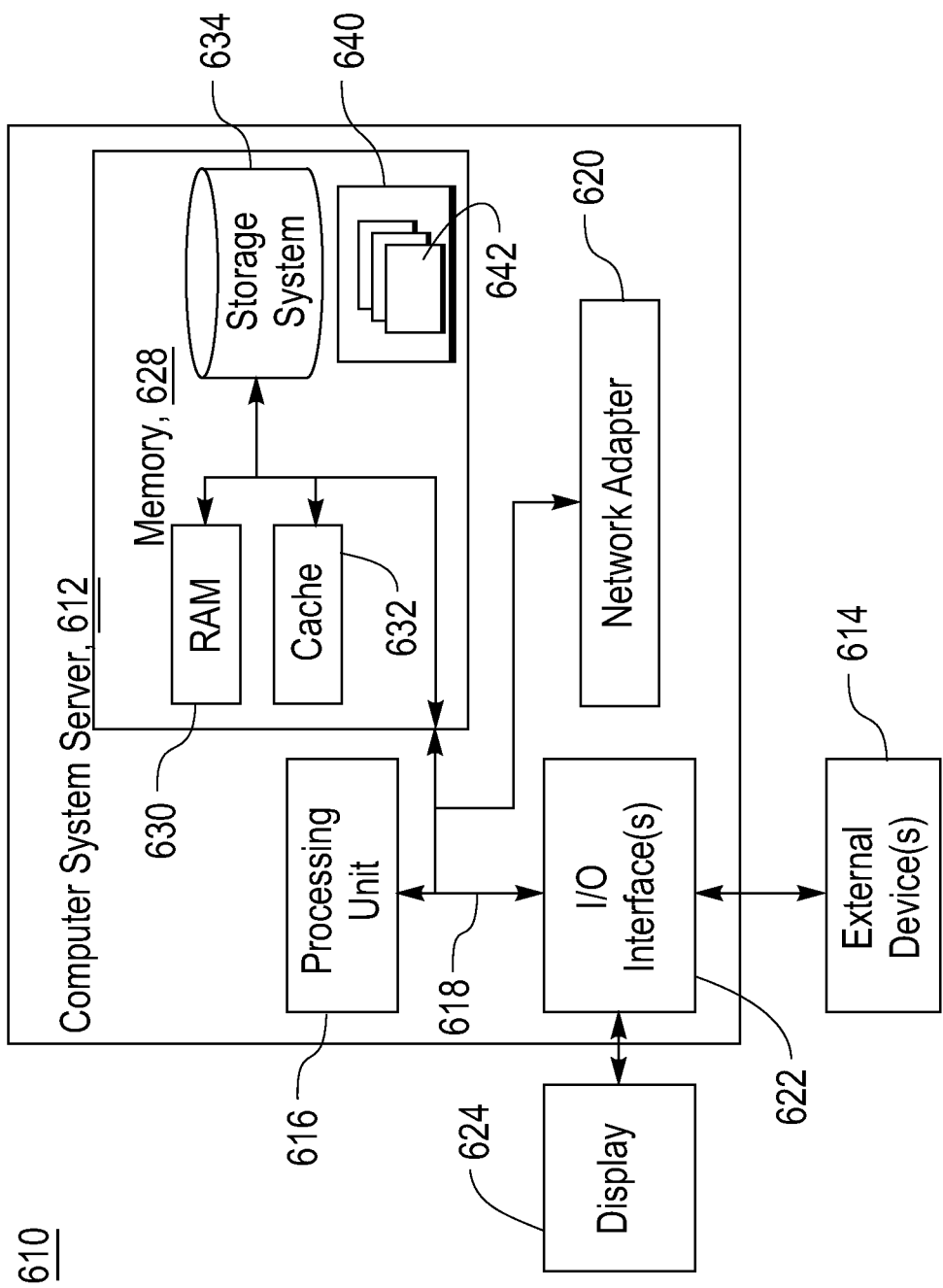
FIG. 6 shows an exemplary cloud computing node, in accordance with an embodiment of the present principles.

Referring now to FIG. 6, a schematic of an example of a cloud computing node 610 is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
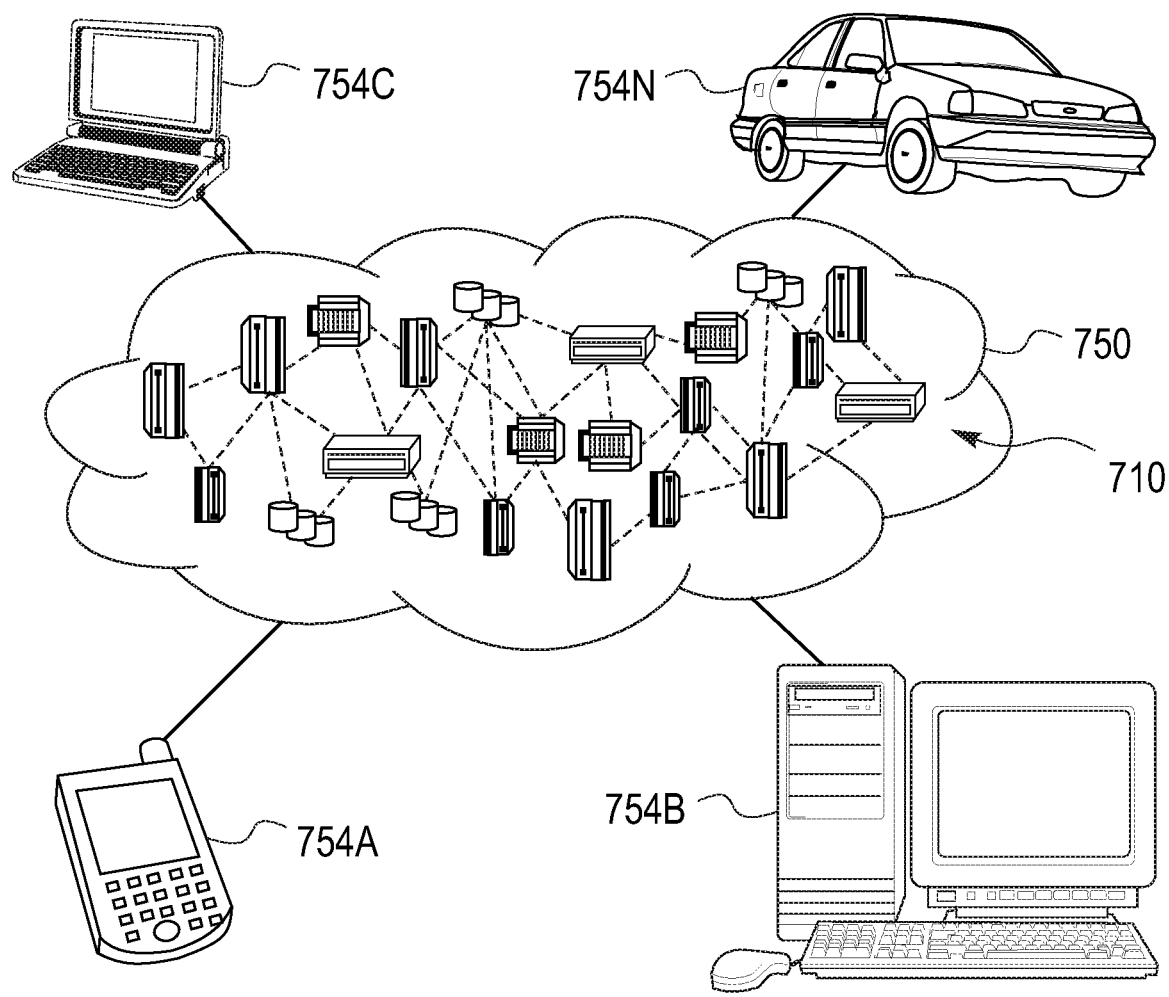
FIG. 7 shows an exemplary cloud computing environment, in accordance with an embodiment of the present principles.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
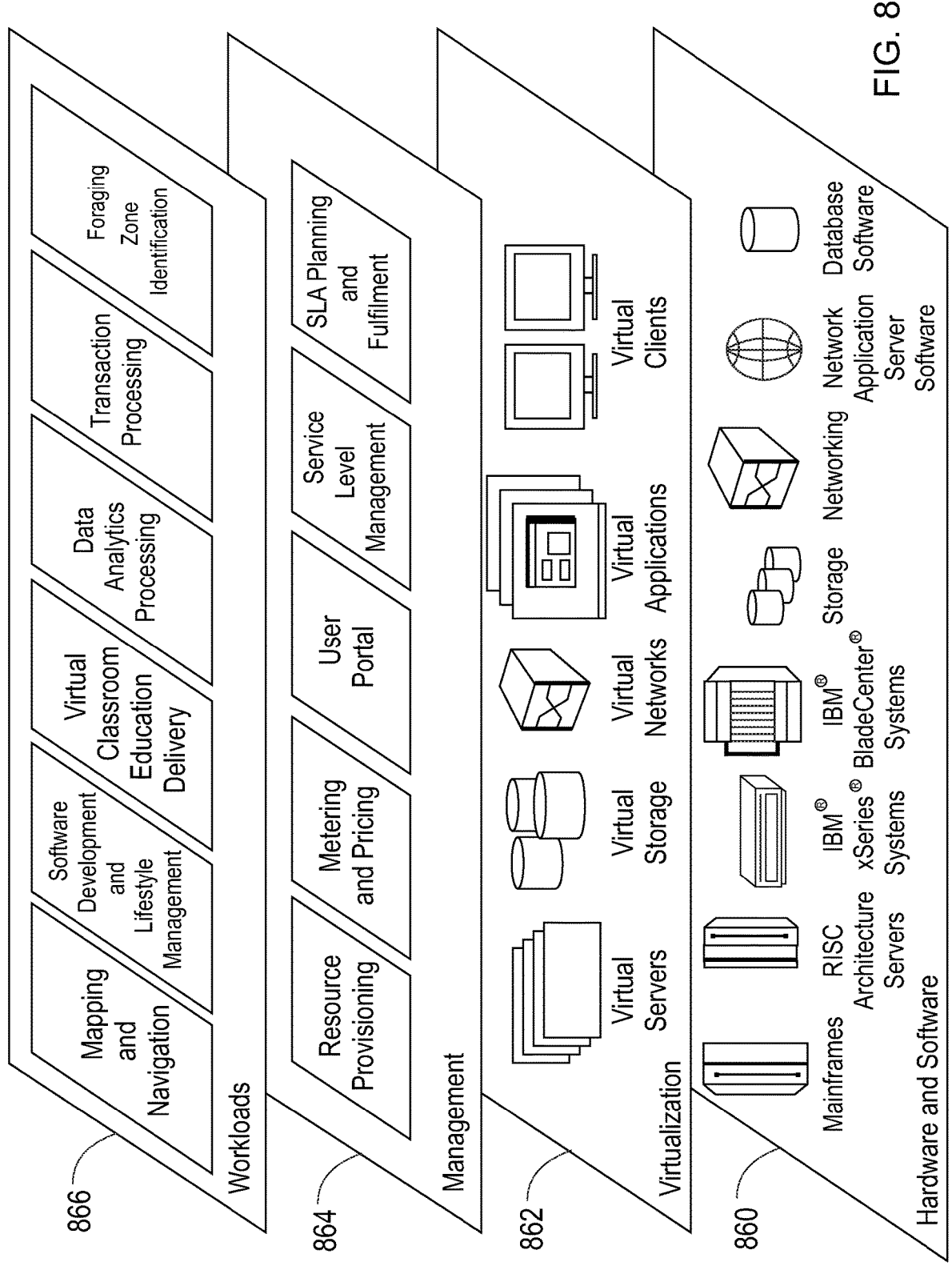
FIG. 8 shows exemplary abstraction model layers, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and foraging zone identification, in accordance with the present invention.

Having described preferred embodiments of an unmanned aerial vehicle for determining geolocation foraging zones for animals, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. An unmanned aerial vehicle for determining geolocation foraging zones for animals, the unmanned aerial vehicle comprising:
    a processor-based monitoring device to monitor a plurality of geolocations;
    an identification device to identify at least one animal including identifying a type of the at least one animal and to track a position of the at least one animal in relation to the plurality of geolocations;
    a risk analysis device to detect topographical features that include a slope variation of the geolocations, and evaluate a level of risk to the at least one animal associated with each of the plurality of geolocations based on the topographical features and the type of the at least one animal; and
    a mapping device coupled to the monitoring device to select at least one geolocation foraging zone when the level of risk associated with the least one geolocation foraging zone is below a predetermined threshold value.

2. The unmanned aerial vehicle of claim 1, wherein the identification device is further configured to identify characteristics of the at least one animal.

3. The unmanned aerial vehicle of claim 1, further comprising a tracking device reader configured to extract identification information relating to the at least one animal stored on a tag attached to the at least one animal.

4. The unmanned aerial vehicle of claim 1, further comprising a guidance generator configured to perform at least one function, wherein the at least one function generates a response in the at least one animal.

5. The unmanned aerial vehicle of claim 4, wherein the at least one function includes guiding the at least one animal to the at least one geolocation foraging zone.

6. The unmanned aerial vehicle of claim 4, wherein the at least one function includes redirecting the at least one animal away from one or more geolocations having landscape boundaries.

7. The unmanned aerial vehicle of claim 4, wherein the at least one function includes splitting animals in a herd into a plurality of groups.

8. The unmanned aerial vehicle of claim 1, wherein the processor-based monitoring device monitors the plurality of geolocations by determining vegetation characteristics over a period of time, the vegetation characteristics being selected from the group consisting of quality of vegetation and quantity of vegetation.

9. The unmanned aerial vehicle of claim 1, wherein the processor-based monitoring device is further configured to monitor landscape boundaries within the plurality of geolocations, the landscape boundaries including physical features of a landscape which result in geolocation foraging zones being excluded from an area.

10. The unmanned aerial vehicle of claim 1, further comprising at least one sensor to monitor one or more weather variables in the plurality of geolocations, wherein the one or more weather variables is employed to determine the level of risk.

11. A method for determining geolocation foraging zones for animals using an unmanned aerial vehicle, the method comprising:
    monitoring, using a processor-based monitoring device, a plurality of geolocations from the unmanned aerial vehicle;
    identifying at least one animal including identifying a type of the at least one animal and tracking a position of the at least one animal in relation to the plurality of geolocations;
    detecting topographical features that include a slope variation of the geolocations;
    evaluating a level of risk to the at least one animal associated with each of the plurality of geolocations based on the topographical features and the type of the at least one animal; and
    selecting at least one geolocation foraging zone when the level of risk associated with the least one geolocation foraging zone is below a predetermined threshold value.

12. The method of claim 11, further comprising performing at least one function, wherein the at least one function generates a response in the at least one animal.

13. The method of claim 12, wherein the at least one function includes guiding the at least one animal to the at least one geolocation foraging zone.

14. The method of claim 12, wherein the at least one function includes redirecting the at least one animal away from one or more geolocations having landscape boundaries.

15. The method of claim 12, wherein the at least one function includes splitting animals in a herd into a plurality of groups.

16. The method of claim 11, wherein monitoring the plurality of geolocations includes determining vegetation characteristics over a period of time, the vegetation characteristics being selected from the group consisting of quality of vegetation; and quantity of vegetation.

17. A non-transitory computer readable storage medium comprising a computer readable program for determining geolocation foraging zones for animals using an unmanned aerial vehicle, wherein the computer readable program, when executed on a computer, causes the computer to execute:
- monitoring, using a processor-based monitoring device, a plurality of geolocations from the unmanned aerial vehicle;
- identifying at least one animal including identifying a type of the at least one animal and tracking a position of the at least one animal in relation to the plurality of geolocations;
- detecting topographical features that include a slope variation of the geolocations;
- evaluating a level of risk to the at least one animal associated with each of the plurality of geolocations based on the topographical features and the type of the at least one animal; and
- selecting at least one geolocation foraging zone when the level of risk associated with the least one geolocation foraging zone is below a predetermined threshold value.

18. The non-transitory computer readable storage medium of claim 17, further comprising performing at least one function, wherein the at least one function generates a response in the at least one animal.

19. The non-transitory computer readable storage medium of claim 18, wherein the at least one function includes guiding the at least one animal to the at least one geolocation foraging zone.

20. The non-transitory computer readable storage medium of claim 18, wherein the at least one function includes redirecting the at least one animal away from one or more geolocations having landscape boundaries.

\* \* \* \* \*